April 5, 1949. T. A. SMOKE 2,466,056
ELECTRIC AUTOMATIC SOLDERING IRON
Filed Jan. 11, 1946

INVENTOR.
THOMAS A. SMOKE

BY

ATTORNEY

Patented Apr. 5, 1949

2,466,056

UNITED STATES PATENT OFFICE 2,466,056

ELECTRIC AUTOMATIC SOLDERING IRON

Thomas A. Smoke, Lakewood, N. J.

Application January 11, 1946, Serial No. 640,638

3 Claims. (Cl. 113—109)

(Granted under the act of March 3, 1883, as
amended April 30, 1928; 370 O. G. 757)

This invention relates to electric automatic soldering irons and is a continuation-in-part of a previous application entitled "Electric automatic soldering iron" having a filing date of September 4, 1945, and Serial Number 614,328.

An object of this invention is to provide an improved feed mechanism for automatic soldering irons.

Another object is to provide a sliding-ratchet feed mechanism.

Figure 2:
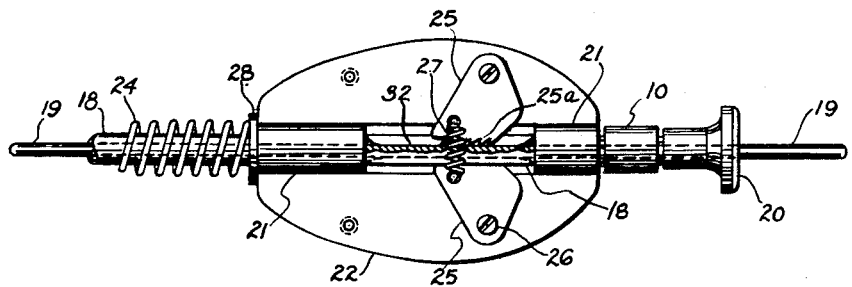
Figure 1:
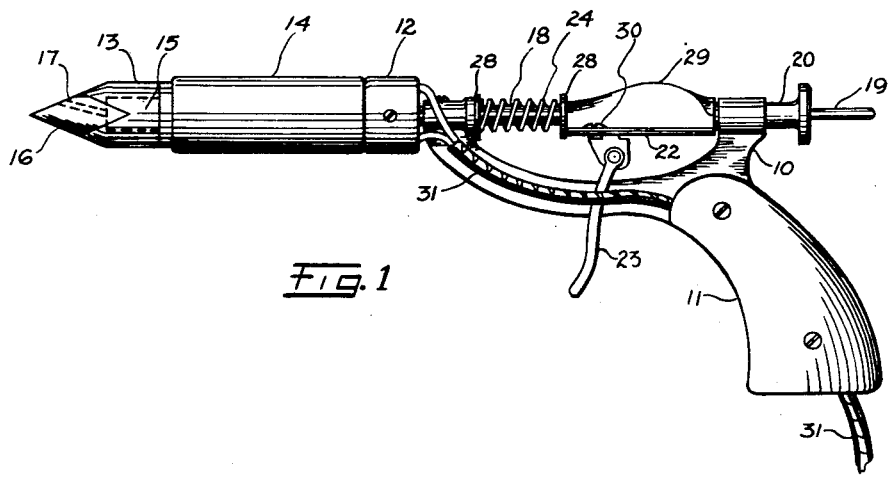

Further objects and advantages of this invention, as well as its construction, arrangement and operation, will be apparent from the following description and claims in connection with the accompanying drawing, in which Fig. 1 is a side view of an electric automatic soldering iron equipped with a preferred embodiment of the sliding-ratchet feed mechanism; and Fig. 2 is a plan view of the feed mechanism with the cover removed.

The assembly of the automatic iron is shown as including a housing or frame 10 and handle 11. Attached to the frame 10 by an insulated connecting block 12 is the soldering barrel 13. Said barrel comprises a heating unit and cover 14, a melting chamber 15 and the soldering tip 16 with its solder outlet 17. The tip is replaceable by a tip of different size and shape. Conductor 31 carries the electrical energy to the heating chamber.

A tube 18 across the top of frame 10 acts as a passage for solder 19, which is fed in through guideway 20. Tube 18 also acts as a support for the feed mechanism (see Fig. 2). Sleeves 21, a part of the sliding frame 22, ride on tube 18. This frame 22 is operated by a trigger 23 secured rotatably at the lower portion of frame 10 and adapted to slide said frame counter a retracting spring 24.

Two ratchet lock dogs 25 are secured to the top of frame 22 by means of dog screws 26 in such position that the ratchet teeth 25a of said dogs 25 engage solder 19 through elongated openings or slots 32 within tube 18. One of said slots is shown in cutaway section in Fig. 2. Ratchet dogs 25 are held in place to engage the solder 19 by means of the ratchet lock spring 27.

Washers 28 act as compression surfaces for spring 24. Cover 29, attached to frame 22 by means of screws 30, covers the working parts of the feed mechanism.

In operation the solder wire is fed into the iron through guideway 20, passing between the ratchet feed mechanism, and on into the barrel 13 where it is melted and allowed to flow out through the soldering iron outlet 17 on to the piece to be soldered. When additional solder is desired, trigger 23 is pulled and the sliding frame 22 with the ratchet lock dogs 25 are forced forward against retracting spring 24. The ratchet teeth 25a grip the solder 19 through the slots 32 in tube 18 and carry the solder along. Upon releasing the pressure on the trigger 23, the retracting spring 24 returns the frame 22, with the lock dogs 25, to the original position.

Various modifications and changes can be made in the subject device without departing from the scope of the invention.

The invention described herein may be manufactured and used by or for the Government of the United States of America for governmental purposes without the payment of any royalties thereon or therefor.

I claim:

1. A strip-solder feed mechanism comprising a solder-passage tube mounted longitudinally on the housing of a soldering iron, said tube having a pair of slots disposed longitudinally and oppositely medial the length of said tube, a pair of sleeves in spaced relation mounted slidably on said tube, a frame secured to said sleeves, a lever mounted rotatably on said housing and having an arm thereof secured rotatably to said frame, means to restrain movement of said frame responsive to actuation of said lever, a pair of ratchet lock dogs mounted rotatably on said frame and slidably in said slots in opposed spaced relation, said dogs having ratchet teeth adapted to engage strip solder carried in said tube upon movement of said frame in one direction, and spring means to disengage said teeth from gripping engagement of said strip.

2. A strip-solder feed mechanism comprising a solder-passage tube mounted longitudinally on the housing of a soldering iron, said tube having a pair of slots disposed longitudinally and oppositely medial the length of said tube, a pair of sleeves in spaced relation mounted slidably on said tube, a frame secured to said sleeves, a lever mounted rotatably on said housing and having one end secured rotatably to said frame, means to restrain movement of said frame responsive to actuation of said lever, a pair of ratchet lock dogs mounted rotatably on said frame and slidably in said slots in opposed spaced relation, said dogs having ratchet teeth adapted to engage strip solder carried in said tube upon movement of said frame in one direction, and spring means connecting said dogs eccentric their respective axes of rotation and adapted to disengage said teeth from gripping engagement of said strip.

3. A strip-solder feed mechanism comprising a solder-passage tube mounted longitudinally on the housing of a soldering iron, said tube having a pair of slots disposed longitudinally and oppositely medial the length of said tube, a pair of sleeves in spaced relation mounted slidably on said tube, a frame secured to said sleeves, trigger means mounted on said housing and adapted to move said frame rectilinearly in one direction relative said tube, spring means mounted on said tube and adapted to restrain said rectilinear movement, a pair of ratchet lock dogs mounted rotatably on said frame and slidably in said slots in opposed spaced relation, said dogs having ratchet teeth adapted to engage strip solder carried in said tube upon movement of said frame in said one direction, and spring means connecting said dogs eccentric their respective axes of rotation and adapted to disengage said teeth from gripping engagement of said strip.

THOMAS A. SMOKE.

REFERENCES CITED

The following references are of record in the file of this patent:

UNITED STATES PATENTS

| Number | Name | Date |
|---|---|---|
| 1,951,441 | Rock | Mar. 20, 1934 |
| 1,951,545 | Carson | Mar. 20, 1934 |